United States Patent
Löhr

(10) Patent No.: US 7,492,774 B2
(45) Date of Patent: Feb. 17, 2009

(54) ROUTING OF MANAGEMENT INFORMATION MESSAGES IN TRANSMISSION NETWORKS

(75) Inventor: Jürgen Löhr, Stuttgart (DE)

(73) Assignee: Alcatel, Paris (FR)

( * ) Notice: Subject to any disclaimer, the term of this patent is extended or adjusted under 35 U.S.C. 154(b) by 986 days.

(21) Appl. No.: 10/453,647

(22) Filed: Jun. 4, 2003

(65) Prior Publication Data

US 2004/0013137 A1 Jan. 22, 2004

(30) Foreign Application Priority Data

Jul. 22, 2002 (EP) .................................. 02360218

(51) Int. Cl.
*H04L 12/28* (2006.01)
(52) U.S. Cl. ..................... 370/401; 370/467; 370/907
(58) Field of Classification Search ................. 370/400, 370/401, 465, 466, 359, 360, 369, 370, 372, 370/375, 380, 392, 419, 408; 709/239
See application file for complete search history.

(56) References Cited

U.S. PATENT DOCUMENTS

| | | | | |
|---|---|---|---|---|
| 5,734,486 | A * | 3/1998 | Guillemot et al. | 398/54 |
| 5,857,092 | A * | 1/1999 | Nakamura et al. | 710/62 |
| 6,094,682 | A * | 7/2000 | Nagasawa | 709/224 |
| 6,233,242 | B1 * | 5/2001 | Mayer et al. | 370/412 |
| 6,404,743 | B1 * | 6/2002 | Meandzija | 370/254 |
| 6,636,515 | B1 * | 10/2003 | Roy et al. | 370/395.1 |
| 6,674,743 | B1 * | 1/2004 | Amara et al. | 370/351 |
| 6,785,225 | B1 * | 8/2004 | Sugawara et al. | 370/225 |
| 7,009,966 | B2 * | 3/2006 | Borchering | 370/386 |
| 7,106,968 | B2 * | 9/2006 | Lahav et al. | 398/47 |
| 2002/0156914 | A1 * | 10/2002 | Lo et al. | 709/238 |
| 2003/0035411 | A1 * | 2/2003 | Moy et al. | 370/352 |
| 2004/0062277 | A1 * | 4/2004 | Flavin et al. | 370/474 |

FOREIGN PATENT DOCUMENTS

WO WO 9959294 11/1999
WO WO 02/054821 A2 7/2002

OTHER PUBLICATIONS

G.709, ITU, 46 pages, Feb. 2001.*
A. McGuire et al, "Interworking Between SDH and OTN-Based Transport Networks", BT Technology Journal, BT Laboratories, gb, vol. 19, No. 3 Jul. 2001, pp. 143-151, XP008000181.

* cited by examiner

*Primary Examiner*—Frank Duong
(74) *Attorney, Agent, or Firm*—Sughrue Mion, PLLC

(57) ABSTRACT

A heterogeneous network consists of an OTN-type sub-network and an SDH type sub-network. The sub-networks are interconnected by an interconnection node network element (NE) which has a first interface (O1-On) connected to OTN-type sub-network (OTN) and a second interface (S1-Sn) connected the SDH-type sub-network (SDH). Management information messages from the data communication channels of received SDH signals and management information messages from the general communication channels of received OTN signals are extracted in the corresponding interfaces. All messages are then fed via a LAN to a common routing engine (R), which routes the management information messages between the OTN and SDH sub-networks.

11 Claims, 2 Drawing Sheets

ROUTING OF MANAGEMENT INFORMATION MESSAGES IN TRANSMISSION NETWORKS

The invention is based on a priority application EP 02 360 218.8 which is hereby incorporated by reference.

FIELD OF THE INVENTION

The present invention relates to the field of telecommunications and more particularly to a method and network element for handling control messages at the junction between an optical transmission network and a synchronous transmission network.

BACKGROUND OF THE INVENTION

Modern transmission networks are composed of a number of interconnected network elements like terminal multiplexers, add/drop multiplexers, crossconnects, and regenerators. Examples of transmission networks are synchronous transmission networks known as SDH or SONET (G.707 October 2000) and optical transport networks (OTN, G.709 February 2001). Such networks serve for the transport of tributary user signals in multiplexed form. ITU-T recommendations G.707 (October 2000) and G.709 (February 2001) are incorporated by reference herein.

SDH technology relies basically on time-division multiplexing while OTN uses basically wavelength-division multiplexing as well as time-division multiplexing. Mappings are provided which allow the transport of SDH type transmission signals in multiplex units of OTN.

Future transmission networks will consist of sub-networks using SDH technology and other sub-networks using OTN technology. Sub-networks using different transmission technologies will be interconnected at "interconnection nodes", containing both SDH and OTN functionality.

A challenge in such heterogeneous future transmission networks will be the management and control of the network. An SDH network is today controlled by its own central network management system. Similar dedicated management systems will also be provided for OTNs. Such management systems are also referred to as operations system (OS).

Both SDH and OTN allow to transport management information in the overhead of transmitted communications signals. In SDH, bytes D1 to D12, referred to as data communication channels (DCC), in the section overhead (SOH) of transmitted signals are reserved for the transport of management information messages. Likewise, the OTN standards provide bytes GCC0 to GCC2, which are termed general communication channels, in the OTU/ODU overhead (OTU: optical channel transport unit, ODU: optical channel data unit).

A problem exists if an SDH sub-network has to be controlled but is reachable from the operations system only via an OTN sub-network, or vice versa. The interconnection node then has to mediate the management information between the SDH and the OTN sub-networks.

A solution to this problem would be the use of two separate network elements (NEs) in the interconnection node, one for SDH and one for OTN, and to pass the management information between these two NEs via dedicated management interfaces. This encompasses, however, the drawback that the management information has to pass through the dedicated external management interfaces of the two NEs in the interconnection nodes and through corresponding separate routing engines for DCC and for GCC. This is however, costly and complex and would increase the delay of management information on its way through the network.

It is thus an object of the present invention to provide a method and corresponding network element which allows the control of heterogeneous transmission networks by an central management system.

SUMMARY OF THE INVENTION

The object is achieved by a network element which has a first interface connected to an optical transport network and a second interface connected a synchronous transmission network. Management information messages from a transmission signal received from the optical transport network are extracted by a first overhead processor assigned to the first interface and management information messages from a transmission signal received from the synchronous transmission network are extracted by a second overhead processor assigned to the second interface. According to the invention, first and second overhead processors feed to a common routing engine, which is adapted to route the management information messages between the optical transport network and the synchronous transmission network as well as within the either of the two networks.

The invention has the advantage that the latency time for management information messages in the interconnection node is lower as less routers are to be passed.

BRIEF DESCRIPTION OF THE DRAWINGS

A preferred embodiment of the present invention will now be described with reference to the accompanying drawings in which.

DETAILED DESCRIPTION OF THE INVENTION

While in the following the invention will be explained in the context of the European synchronous digital hierarchy, it is clear that the invention will equally apply to any other kind of synchronous transmission networks such as North American synchronous optical network (SONET).

Figure 1:
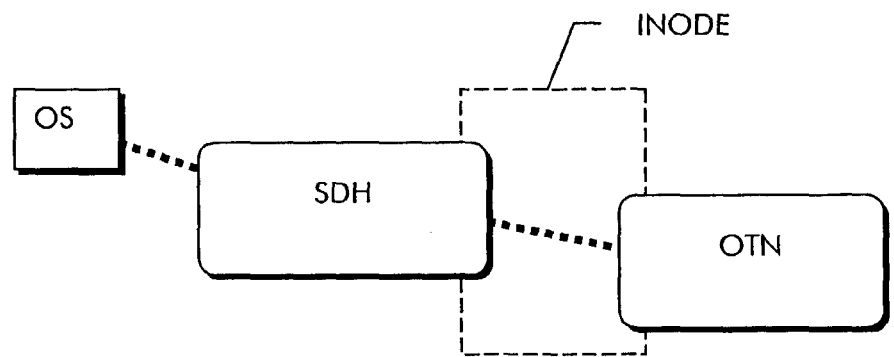
FIG. 1 shows a heterogeneous transmission network.

A heterogeneous network comprising an SDH sub-network and an OTN sub-network is shown in FIG. 1. Sub-networks SDH and OTN are interconnected by means of an interconnection node INODE and controlled by a operational system OS, which is connected to sub-network SDH. A preferred aspect of the invention is that one network management system OS controls both sub-network.

Figure 2:
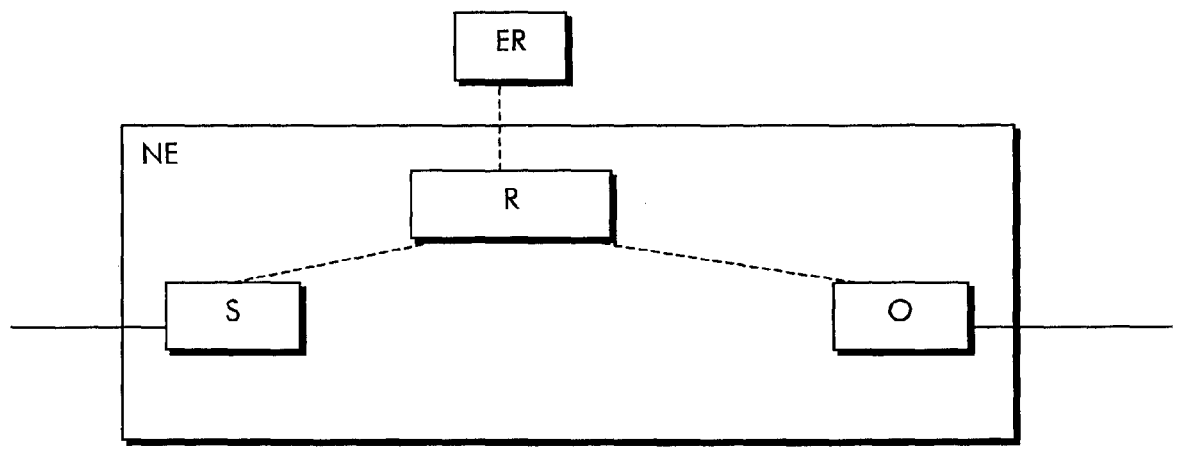
FIG. 2 shows a network element according to the invention.

An apparent approach for the design of the interconnection node as described above would encompass the use of two separate network elements in the interconnection node, one for SDH and one for OTN. However, an important aspect of the invention is to use a single network element NE to interconnect the two sub-networks. This is schematically shown in FIG. 2.

Network element NE has a first interface S connected to the SDH sub-network and a second interface O connected to network OTN. Interface S extracts management information messages from data communication channels (DCC) of received SDH-type transmission signals and forwards these messages to a router R. Likewise, interface O extracts management information messages from general communication channels (GCC) of received OTN-type transmission signals and forwards these messages to router R.

It is thus a basic idea that the network element NE, which supports both SDH and OTH interfaces, and which implements the interconnection node as described above, performs routing of the DCC and GCC messages within the same part system, e.g. the same router R. Management information messages typically use OSI protocol and carry origin and destination network addresses of the corresponding network elements. Router R is thus an OSI router. Preferably, router R dynamically sets up its routing table by exchanging routing information with routers of neighbouring network elements. This has the advantage that routing information is dynamically updated when link failures or configuration changes occur in the network. However, it is also possible to configure the routing information in each router in the network centrally.

Preferably, router R is also connected to an external router ER. This allows intra-office interconnections of multiple network elements within the same node as well as access to local control or craft terminals. Router R is implemented as a software-driven device, wherein the routing hardware in combination with its routing software performs all routing steps and dynamic generation of routing tables.

As an alternative to OSI protocol, management information messages on DCC and GCC can also make use of the internet protocol (IP), whereby each interface board of each network element would have its own IP address.

The function of the interconnection node will now be described with reference to FIG. 3, which shows network element NE in more detail. In the preferred embodiment, NE is a crossconnect which interconnects a number of sub-networks and establishes paths through the network at any multiplexing level. A path is represented by a sequence of multiplexing units, e.g., virtual containers (VC-N) or optical channel data units (ODUk), which are switched through the network from end to end without modifications to the contents of each multiplex unit.

Figure 3:
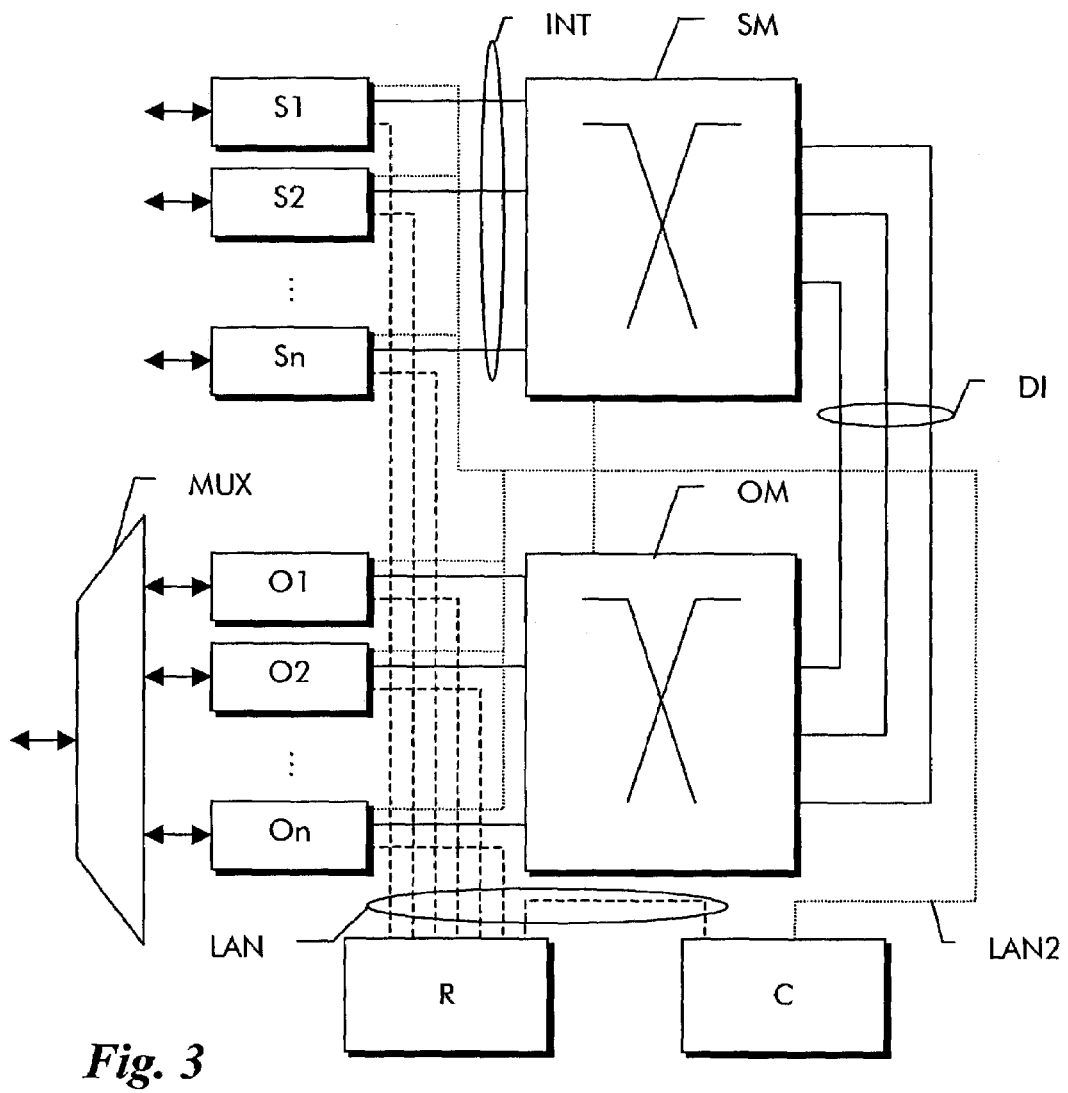
FIG. 3 shows a more detailed block diagram of a network element.

The network element shown in FIG. 3 has a number of SDH-type interfaces S1-Sn receiving and transmitting synchronous transport modules (STM-N). Interfaces S1-Sn lead via internal interconnections INT to a synchronous switching matrix SM. Preferably, switching matrix SM is a time-space-time switching matrix, which allows to switch virtual containers at any level down to VC-12 from any to any port.

Network element NE has further a number of OTN-type interfaces O1-On receiving and transmitting optical transport units (OTUk). Interfaces O1-On can be simple "black-and-white" optical interfaces or coloured interfaces receiving and transmitting one single dedicated wavelength, each. Anyway, interfaces O1-On receive and transmit only one wavelength channel, each. On the input side, optical interfaces O1-On are connected to a wavelength multiplexer/demultiplexer MUX which breaks the wavelength-multiplexed signal from the OTN into its constituent wavelengths and connects one wavelength channel to each of the optical interfaces.

Optical interfaces O1-On are connected to a space switch matrix OM. Space switch matrix OM and synchronous switching matrix SM are interconnected via dedicated internal interconnections D1. This allows to interconnect different types of sub-networks. For example an STM-64 signal received at interface S1 is switched through matrix SM via a dedicated internal interconnection D1 to matrix OM. At matrix OM, the STM-64 signal is mapped into an optical data unit ODU2 using asynchronous mapping and switched trough matrix OM to interface O1, where it is sent as payload of an OTU2 frame.

According to the invention, interfaces S1 to Sn extract management information messages from the DCCs of received STM-N signals and forward the messages to router R. Interfaces O1 to On extract management information messages from the GCCs of received OTUk signals and forward the messages to router R, as well. Router R routes the messages to the appropriate destination ports and thus allows interworking of network management functions between SDH and OTN sub-networks and control of a heterogeneous network by a single network management system. For example a message received at interface S1 may be destined for a remote network element on a path that leads over interface O2. The message is thus extracted from the DCC at S1 and routed by router R to interface O2 where it is inserted into the GCC of the transmit OTUk signal.

Protocol messages destined for the local network element NE are routed to a local control unit C, which controls configuration and performs local operation, administration and maintenance functions (OAM). Interconnections between interfaces S1-Sn, O1-On, router R, and control unit C are established in the preferred embodiment via a local area network LAN using Ethernet technology, e.g., 10baseT. The LAN is shown as slashed lines in FIG. 3. However, it would be clear that any other internal interconnection technology like serial links or others could also be envisaged instead of LAN technology.

Router R may either be integral part of network element NE or can be implemented as a stand-alone device. As it not necessary that each network element in a transmission network has its own DCC/GCC router, the latter alternative has the advantage that DCC/GCC routers can be added later to an existing network topology when required. In this case, each interface board of the network element and the local control unit C have external LAN ports to connect via the LAN to router R, which also has corresponding LAN ports. It is also possible that more than one router are associated with one network element and that routing is shared among these several routers. For example the network element can be distributed among several shelves and one router can be installed within each shelf. In this case, the several physical routers perform all the same routing functions for messages to and from their corresponding shelf and can be seen from outside as one logical device.

Control unit C is connected to the switching matrices SM and OM and to the interface boards S1-Sn, O1-On for the purpose of internal control and configuration via an internal local area network LAN2 shown as dotted lines in FIG. 3. Internal communication between control unit C, interface boards, and matrix boards over LAN2 is based on the internet protocol (IP).

Communication between router, overhead processor and controller is typically bi-directional. As an alternative to having two independent LANs, one for the GCC/DCC communication and one for internal control purposes, it would also be possible to have a single LAN. Router R can also be an multi-protocol router for both, IP and OSI protocol.

Figure 4:
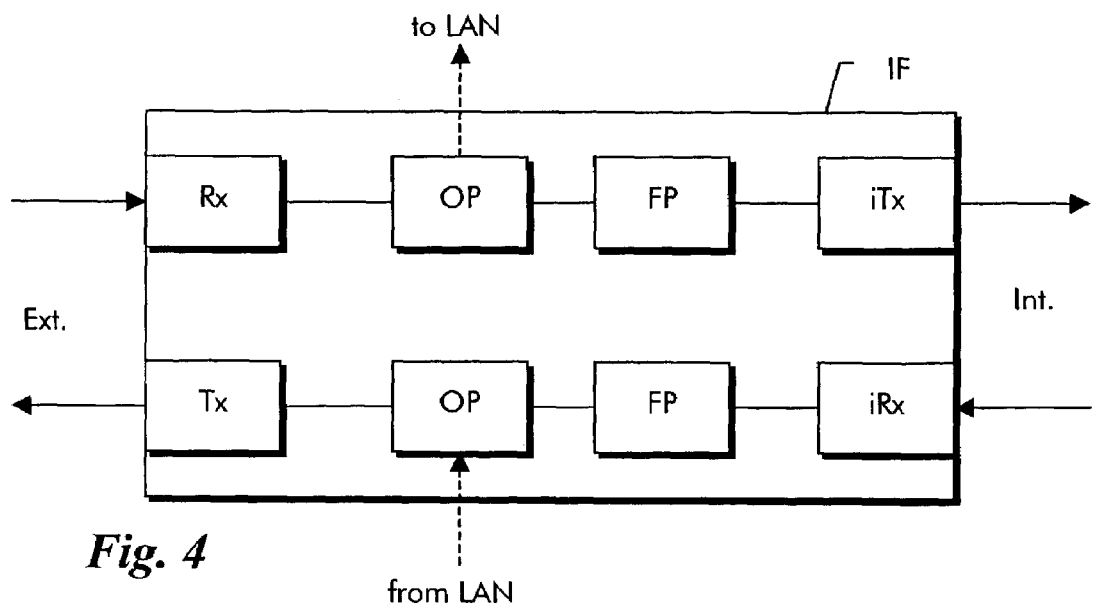
FIG. 4 shows an interface for a network element according to the invention.

The functions of the interfaces is shown in FIG. 4. The interface IF shown can be either an SDH-type interface or an OTN-type interface. In the following it is assumed that interface IF is an SDH-type interface. However, functionality with respect to management information message extraction and overhead termination are similar for OTN-type interfaces. Left-hand external input/outputs are connected to the network and right-hand internal input/outputs are connected to the switching matrix of the network element.

Signals from external network are received by optical receiver Rx, which regenerates the received signal and performs O/E conversion. Rx is connected to an overhead processor OP which terminates the section overhead and extracts overhead bytes from the received communication signal. These overhead bytes include the DCCs and the overhead processor forwards control messages received in the DCCs in the form of OSI packets over the LAN to the DCC/GCC router.

From the overhead processor OP, the signal is passed to the frame processor FP, which generates an internal frame format suited for further processing by the switching matrix. In the case of STM-N framed signals, the frame processor processes the tributary unit (TU) pointers to re-synchronize the received signal to a local clock (not shown) and fixes the administration unit (AU) pointer. This locks the individual tributary units contained in an STM-N frame into predefined time slots, so that the time switch function in the switching matrix can perform simple time slot interchanging. The processed signal in the internal frame format is then sent by internal transmitter iTx to the switching matrix. The internal interconnection between interface and switching matrix can be either electrical or optical depending on bitrate and distance.

In transmit direction, an internal signal, being structured according to the same internal frame format, is received by internal receiver iRx from the switching matrix. The internal signal is then processed by frame processor FP to structure the signal into the STM-N frame format. Frame processor FP passes the signal to overhead processor OP which performs section overhead termination functions by generating and inserting appropriate overhead bytes. Overhead processor OP is connected over the LAN to the router to receive management information messages to be sent. Overhead processor OP inserts such management information messages into the DCCs in the section overhead of outgoing STM-N frame.

Having understood the principles of the present invention as described above by way of a non-limiting embodiment, it would be apparent to those skilled in the art that several modifications and alternatives are possible without departing from the scope of the invention. The present invention provides a powerful solution for managing resources in heterogeneous transport networks and thereby greatly simplifies control of the network and reduces the operational costs for the network operators. The invention is equally applicable to controlling a heterogeneous network controlled by a single operations system or by several independent operations systems as it allows to reach network elements of a first transport technology via links of a second transport technology.

What is claimed is:

1. A network element comprising:
   at least one first interface for interfacing a synchronous transmission network;
   at least one second interface for interfacing an optical transport network;
   a first overhead processor assigned to said first interface for extracting management information messages from a transmission signal received from the synchronous transmission network;
   a second overhead processor assigned to said second interface for extracting management information messages from a transmission signal received from the optical transport network; and
   a common routing engine connected to said first and second overhead processors, said routing engine being adapted to route said management information messages between the optical transport network and the synchronous transmission network.

2. A network element according to claim 1, wherein said interfaces and said routing engine are interconnected by means of a local area packet network.

3. A network element according to claim 1 comprising a number of first type interfaces feeding to a synchronous switching matrix; a number of second type interfaces feeding to a space switching matrix and at least one dedicated internal interconnection between said synchronous switching matrix and said space switching matrix.

4. A network element according to claim 1 further comprising a local control unit connected to said routing engine.

5. A network element according to claim 1, wherein said control unit is connected to the at least one first interface and the at least one second interface via a second internal local area network.

6. A network element according to claim 1, wherein the management information messages from the transmission signal received from the Optical Transport Network are located in General Communication Channels (GCC) in Optical Channel Transport Unit (OTU)/Optical Channel Data Unit (ODU) overhead of the transmission signal received from the Optical Transport Network.

7. A network element according to claim 1, wherein the management information messages from the transmission signal received from the synchronous transmission network are located in data communication channels (DCC) in Section Overhead (SOH) of the transmission signal received from the synchronous transmission network.

8. A network element according to claim 1, wherein synchronous transmission network use Synchronous Digital Hierarchy (SDH) or Synchronous Optical Networking (SONET) technology.

9. A network element according to claim 1, wherein optical transport network use Optical Transport Network (OTN) technology.

10. A router for routing management information messages in a network element interfacing an optical transport network and a synchronous transmission network, said router comprising LAN ports connectable to first-type interfaces interfacing a synchronous transmission network and second-type interfaces interfacing an optical transport network; and further comprising a routing hardware and/or software adapted to route management information messages extracted at said first-type or second-type interfaces from transmission signals received from the synchronous transmission network or the optical transport network, respectively, between the optical transport network and the synchronous transmission network.

11. A method of handling management information messages in a network element interfacing an optical transport network and a synchronous transmission network, said method comprising the steps of:
   extracting management information messages from a transmission signal received from the synchronous transmission network;
   extracting management information messages from a transmission signal received from the optical transport network;
   feeding management information messages received from either network to a common routing engine; and
   routing said management information messages within and between the optical transport network and the synchronous transmission network.

* * * * *